US010977691B2

(12) United States Patent
Jain et al.

(10) Patent No.: US 10,977,691 B2
(45) Date of Patent: Apr. 13, 2021

(54) RECOMMENDING SHARED ELECTRONIC CONTENT VIA ONLINE SERVICE

(71) Applicant: Adobe Inc., San Jose, CA (US)

(72) Inventors: Ajay Jain, Ghaziabad (IN); Mansukh Patidar, Greater Noida (IN)

(73) Assignee: Adobe Inc., San Jose, CA (US)

(*) Notice: Subject to any disclaimer, the term of this patent is extended or adjusted under 35 U.S.C. 154(b) by 861 days.

(21) Appl. No.: 14/318,992

(22) Filed: Jun. 30, 2014

(65) Prior Publication Data
US 2015/0379582 A1 Dec. 31, 2015

(51) Int. Cl.
G06F 17/00 (2019.01)
*G06Q 30/02* (2012.01)
*G06Q 50/00* (2012.01)

(52) U.S. Cl.
CPC ......... *G06Q 30/0269* (2013.01); *G06Q 50/01* (2013.01)

(58) Field of Classification Search
CPC ............................. G06Q 30/0269; G06F 17/30
USPC .......................................................... 707/770
See application file for complete search history.

(56) References Cited

U.S. PATENT DOCUMENTS

| | | | | |
|---|---|---|---|---|
| 8,578,275 B2 * | 11/2013 | Brolley | .............. | G06Q 30/0282 715/738 |
| 2003/0036980 A1 * | 2/2003 | Wren | ..................... | G06Q 30/02 705/14.54 |
| 2003/0167443 A1 * | 9/2003 | Meunier | ............... | G06F 16/957 715/255 |
| 2003/0208543 A1 * | 11/2003 | Enete | .................. | H04L 12/1822 709/206 |
| 2006/0167747 A1 * | 7/2006 | Goodman | .............. | G06Q 30/02 705/14.53 |
| 2008/0027909 A1 * | 1/2008 | Gang | ..................... | G06F 16/954 |
| 2009/0063265 A1 * | 3/2009 | Nomula | ............ | G06F 17/30864 705/14.66 |
| 2009/0249244 A1 * | 10/2009 | Robinson | ............ | G06F 3/04842 715/781 |
| 2009/0298480 A1 * | 12/2009 | Khambete | ............. | G06F 16/335 455/414.1 |
| 2010/0042932 A1 * | 2/2010 | Lehtiniemi | ............ | G06Q 30/02 715/747 |
| 2011/0138306 A1 * | 6/2011 | Soohoo | .................. | G06Q 30/00 715/760 |
| 2012/0084151 A1 * | 4/2012 | Kozak | .................... | G06Q 30/02 705/14.58 |

(Continued)

Primary Examiner — Hasanul Mobin
(74) Attorney, Agent, or Firm — Kilpatrick Townsend & Stockton LLP

(57) ABSTRACT

Systems and methods are disclosed for recommending shared electronic content via an online service. In some embodiments, a server can identify a first subscriber and a second subscriber to an online service that have access via the online service to an application for using or editing electronic content. The server can also determine a correspondence between usages of the application by the first and second subscribers via the online service with respect to at least one attribute of the application. The server can also identify an electronic content item generated with the application by the first subscriber. The server can also provide, via the online service, a recommendation for the electronic content item to the second subscriber based on the correspondence between the first usage and the second usage with respect to one or more attributes of the application.

18 Claims, 6 Drawing Sheets

(56) References Cited

U.S. PATENT DOCUMENTS

| | | | | |
|---|---|---|---|---|
| 2012/0137221 A1* | 5/2012 | Bhandari | | G06F 3/0482 |
| | | | | 715/719 |
| 2012/0232973 A1* | 9/2012 | Robb | | G06Q 50/01 |
| | | | | 705/14.17 |
| 2012/0254099 A1* | 10/2012 | Flinn | | G06F 40/20 |
| | | | | 706/52 |
| 2014/0059231 A1* | 2/2014 | Choi | | H04M 1/72583 |
| | | | | 709/226 |
| 2014/0278968 A1* | 9/2014 | Strompolos | | G06Q 30/0249 |
| | | | | 705/14.52 |
| 2014/0324846 A1* | 10/2014 | Rekhi | | G06Q 10/10 |
| | | | | 707/725 |
| 2014/0372902 A1* | 12/2014 | Bryant | | G06Q 30/0281 |
| | | | | 715/748 |
| 2015/0067724 A1* | 3/2015 | Johnson | | H04N 21/4668 |
| | | | | 725/32 |
| 2017/0091263 A1* | 3/2017 | Fredinburg | | G06F 16/335 |

* cited by examiner

```
Struct serviceUser {
Subscription ID;
Profile Type {Retail Edition, Student Edition)};
Subscription Type {Paid, Trial};
Subscription State {Active, Inactive};
Product Installed {Image_App_1, Image_App_2};
Product Version {IA1_14.2, IA2_17.0.1};
Most Recent Updates installed {Yes, No};
Toolset Used {
    Product (Image_App_1) Toolset: {
        Measuring Tools {Eyedropper, Ruler, Count etc}
        Retouching Tools {Spot Eraser, Patch, Copy Tool, Eraser, Blur}
        Painting Tools {Brush, Pencil, Mixer Brush, Artistic Effects Brush}
        Drawing and Type Tools {Pen, Freeform Pen, Anchor point, Rectangle}
        Navigation and 3D Tools    {3D Object Rotate, 3D Object Roll, 3D Rotate Camera}
    }

Product (Image_App_2) Toolset:  {
        Drawing Tools {Pen, Spiral, Polar Grid, Ellipse, Perspective Grid etc}
        Painting Tools {Paintbrush, Blob Brush, Mesh, Gradient etc}
        Graph Tools {Column, Line, Bar, Scatter Graph etc}
        Reshaping Tools {Reflect, Shear, Pucker, Bloat, Blend etc}
        Symbol Tools {Shifter, Scruncher, Spinner, Stainer etc}
    }
};
Frequency of Toolset (1 to N} Usage;
Segment {Novice, Intermediate, Expert};
Association {New, Regular, Intermittent};
Community Participation Level {Consumer, Producer, Both, None};
Usage Pattern {Low, Frequent, Heavy});
}
```

RECOMMENDING SHARED ELECTRONIC CONTENT VIA ONLINE SERVICE

TECHNICAL FIELD

This disclosure relates generally to computer-implemented methods and systems and more particularly relates to recommending shared electronic content via an online service.

BACKGROUND

Online services may provide forums for selling, purchasing, or otherwise sharing creative content. For example, artists may wish to promote and sell artwork, video content, music, etc. Enterprises and other business that sell creative content may wish to connect prospective buyers and sellers, and thereby incentivize artists and other creative professionals to upload creative content to online forums. Moreover, subscribers to online services may wish to receive promotions of creative content from artists or enterprises that is more relevant to the subscriber.

Prior solutions for promoting the sale of creative content or other online content may be limited to tracking the expressed interest of a user in particular subjects. For example, recommendations for particular content or services may be presented to a user based on the user having looked at similar content or having browsed similar websites.

A disadvantage of these prior solutions is that creative content or other electronic content may be recommended to a user without regard to the application, computing environment, or other context in which the user may view or edit that content. In one example, a user who is an expert in utilizing certain content manipulation tools (e.g., an image editing application, a video editing application, etc.) may be uninterested in receiving promotions for relatively simplistic creative content. In another example, a user who wishes to purchase or otherwise obtain editable image content (e.g., a template for a design project) may use a version of a content manipulation tool with a reduced set of features (e.g., a trial version of the content manipulation tool). Such a user may have little interest in receiving recommendations for image content that was created using tools or features to which the user does not have access.

Improved methods for recommending electronic content for use by members of an online service are therefore desirable.

SUMMARY

According to certain embodiments, computing devices can perform one or more operations for recommending shared electronic content via an online service. In some embodiments, a server can identify a first subscriber and a second subscriber to an online service that have access via the online service to an application for using electronic content. The server can also determine a correspondence between usages of the application by the first and second subscribers via the online service with respect to at least one attribute of the application. The server can also identify an electronic content item generated with the application by the first subscriber. The server can provide, via the online service, a recommendation for the identified electronic content item to the second subscriber based on the correspondence between the first usage and the second usage with respect to the attribute of the application.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where:

FIG. 5 is an example of a subscriber profile record that can be used to identify how a given subscriber to the online service may utilize one or more applications according to certain exemplary embodiments.

DETAILED DESCRIPTION

Figure 1:
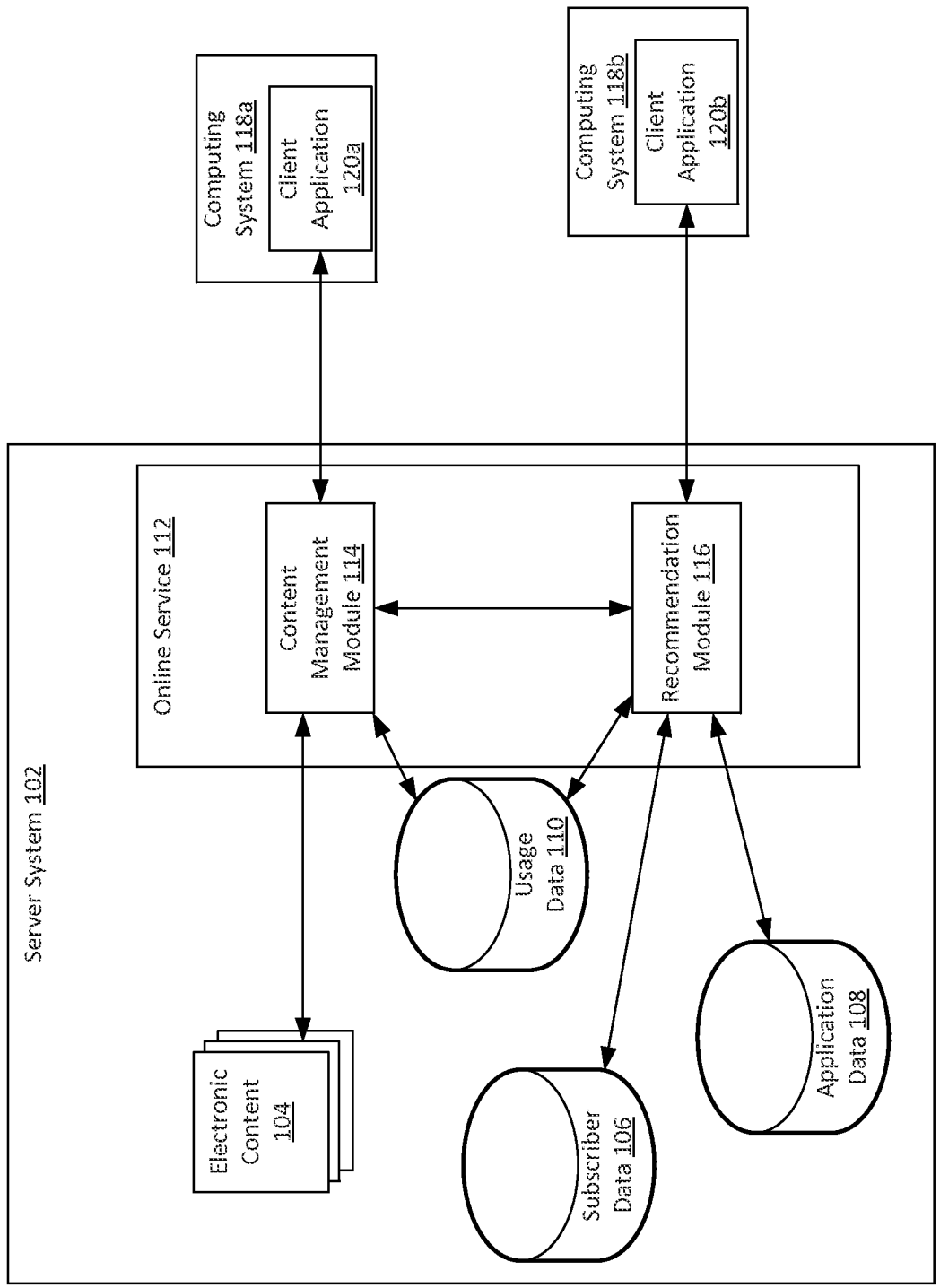
FIG. 1 is a block diagram depicting an example of a system for recommending shared electronic content via an online service according to certain exemplary embodiments.

Computer-implemented systems and methods are disclosed for recommending shared electronic content via an online service. The online service can determine recommendations of electronic content for a potential consumer based on how the consumer uses a given application provided by the online service, one or more attributes of the that application, a level of participation in the online service by the consumer, and/or other relevant attributes of the consumer with respect to the online service. The online service can generate recommendations by identifying electronic content shared via the online service and/or other subscriber profiles that correspond to these relevant attributes of the consumer. The online service can thereby facilitate personalized and contextually relevant sharing, promotion, and sales of content between creators and consumers of electronic content in an online community.

The following non-limiting example is provided to help introduce the general subject matter of certain embodiments. A creative artist may create artwork (e.g., an image of a sunset stored in an image file) with a particular image manipulation application and upload the artwork to an online community provided by an online service. The creative artist may use the online service to promote the artwork for sale to particular subscribers within the community who use similar electronic content and/or similar viewing or editing applications and features as the artist. For example, the creative artist may wish to promote his or her artwork to students at a particular university. The creative artist can use the online service to create a promotion campaign that identifies students from the university as preferred buyers or consumers. The online service can identify subscribers to the online community who are students of the university. The online service can also identify which of these subscribers have used the same image manipulation application that was used to create the artist's artwork and who have done so in a manner similar to the artist. For example, the online service can identify subscriber accounts having parameters that are similar to the subscriber account for the artist. Non-limiting examples of these parameters include the type of software product downloaded from the online service (i.e., the image manipulation application), the product version, the tools or other features of the software product used by the subscriber, etc. The online service can also identify subscribers based on their usage patterns being similar to those of the creative artist with respect to usage of the image manipulation application (e.g., over 150 launches of the application, total usage of the application that is greater than 1500 minutes, etc.). The online service can recommend the creative artist's artwork to the subscriber accounts identified as closely matching the artist's promotional campaign and being similar to the creative artist (i.e., students of the university who have downloaded the same image manipulation application and used the image manipulation application in a similar way as the creative artist). Thus, the artist's artwork can thus be promoted to potential consumers who are more likely to be interested in the artwork.

In accordance with some embodiments, a server can identify a first subscriber and a second subscriber to an online service that have access via the online service to an application for generating electronic content (e.g., an image manipulation application downloaded from or used within the online service). The server can also determine a correspondence between usages of the application by the first and second subscribers via the online service with respect to at least one attribute of the application (e.g., similar subscription types, similar usage patterns, similar usage frequencies, similar features used, similar levels of expertise, etc.). The server can also identify an electronic content item (e.g., creative artwork) generated with the application by the first subscriber. The server can provide, via the online service, a recommendation for the electronic content item to the second subscriber based on the correspondence between the usages of the application with respect to the attribute of the application.

As used herein, the term "electronic content" is used to refer to any type of media that can be rendered for display or use at a computing system or other electronic device. Electronic content can include text or multimedia files, such as images, video, audio, or any combination thereof. Electronic content can also include application software that is designed to perform one or more specific tasks at a computing system.

As used herein, the term "online service" is used to refer to one or more computing resources (including computing systems and/or applications) that can be provided to subscribers via a data network. The collection of computing systems and/or hardware can be represented as a single service. The online service can provide a digital hub for browsing, creating, sharing, and otherwise using electronic content using one or more applications provided via the online service. In some embodiments, the online service can be implemented using cloud-based computing. For example, the online service can be accessed from a virtual server implemented using a number of computing systems connected in a grid or other distributed computing topology.

As used herein, the term "subscriber" is used to refer to an individual, organization, or other logical identity that can be uniquely identified by an online service executed on a server system. An entity can be identified by reference to one or more client accounts and/or by reference to a software identifier and/or hardware identifier associated with an application and/or device used to access the online service or other server system.

Referring now to the drawings, FIG. 1 is a block diagram depicting an example of a system for recommending shared electronic content via an online service. The system depicted in FIG. 1 includes a server system 102 that stores or can otherwise access electronic content 104, subscriber data 106, application data 108, and usage data 110. The server system 102 can also store or otherwise access program code that can be executed by a processing device of the server system 102 to provide an online service 112. The program code for providing the online service 112 can include (but is not limited to) a content management module 114 and a recommendation module 116. Subscribers to the online service 112 can upload or otherwise provide electronic content 104 to the online service 112 via the content management module 114. The server system 102 can communicate with computing systems 118a, 118b that are used by subscriber to execute client applications 120a, 120b for accessing the online service 112.

In some embodiments, the client applications 120a, 120b can be or can include applications for establishing a session with the online service 112. In a non-limiting example, one or more of the client applications 120a, 120b may be a web browser application that can establish a session with a web site via which the online service 112 may be accessed. The web browser application or other client application can include one or more suitable modules for accessing and using applications provided via the online service 112 (e.g., a Java plug-in for accessing an image manipulation application hosted on the server system 102). The web browser application or other client application can provide a credential that may be authenticated by the online service 112 to establish a session. The credential may include a user name, password, or other suitable credential used to verify that the subscriber using one of the client applications 120a, 120b is authorized to access the online service 112. Authenticating the subscriber can involve comparing authentication information in the credential with authentication information stored in the subscriber data 106.

In additional or alternative embodiments, the client applications 120a, 120b can be executed at the respective computing systems 118a, 118b for generating, modifying, or otherwise using electronic content without accessing the online service 112. Separate applications, such as (but not limited to) web browser applications, may be executed at the computing systems 118a, 118b for establishing communication sessions with the online service 112 and uploading or otherwise providing content that has been generated, modified, or otherwise used by the client applications 120a, 120b to the online service 112.

The subscriber data 106 can include information describing subscribers to the online service 112. For example, the subscriber data 106 can include subscriber account records uniquely identifying each user or other entity having a subscription to the online service 112. The subscriber account records can include information such as (but not limited to) the type of subscription (e.g., paid subscriber, trial user, etc.), the state of the subscription (e.g., active or inactive), how long the subscription has been active, dates on which the subscriber has renewed the subscription, etc. In some embodiments, the subscriber data 106 or another data source can include additional identifying information about a subscriber (e.g., telephone number, mailing address, demographics, etc.). In some embodiments, the subscriber data 106 or another data source can include information about which services, products, applications, etc. have been downloaded, purchased, or otherwise used by a subscriber.

The subscriber data 106 can include one or more databases or other suitable data sources that are stored in a non-transitory computer-readable medium. Although FIG. 1 depicts the subscriber data 106 as being stored in the server system 102 for illustrative purposes, other implementations are possible. For example, the subscriber data 106 can be stored in a non-transitory computer-readable medium of another computing system that is accessible by the server system 102 via a data network.

The application data 108 can include program code for one or more applications that can be provided from the server system 102 to computing system 118*a*, 118*b*. The application data 108 can also include information describing the applications, such as which subscribers or computing systems have download applications from the server system 102 using the online service 112. The application data 108 can include one or more databases or other suitable data sources that are stored in a non-transitory computer-readable medium. Although FIG. 1 depicts the application data 108 as being stored in the server system 102 for illustrative purposes, other implementations are possible. For example, the application data 108 can be stored in a non-transitory computer-readable medium of another computing system that is accessible by the server system 102 via a data network.

The usage data 110 can include information describing usage by subscribers of different applications provided via the online service 112. For example, the usage data 110 can include records identifying a particular application, a version of the application, a particular subscriber who has used the application, features of the application used by the subscriber, etc. The usage data 110 can include one or more databases or other suitable data sources that are stored in a non-transitory computer-readable medium. Although FIG. 1 depicts the usage data 110 as being stored in the server system 102 for illustrative purposes, other implementations are possible. For example, the usage data 110 can be stored in a non-transitory computer-readable medium that is accessible by the server system 102 via a data network.

The server system 102 can execute the content management module 114 or other suitable program code to identify and track applications and features used by each subscriber to the online service 112. Events generated by using applications and features can be logged and associated with an identifier for a subscriber and/or a computing system 118*a* used by a subscriber. The server system 102 can track applications installed by the subscriber within a recent time period (e.g., a period of weeks, months, etc.). For example, an application usage and tracking module executed by the server system 102 can log events in which applications are downloaded from the server system 102 by creating or modifying records in the application data 108. The records in the application data 108 can be linked to or otherwise referenced by corresponding records in the subscriber data 106 to indicate that a given subscriber has downloaded and installed a given application.

The server system 102 can also track features used by the subscriber within a recent time period. The server system 102 can also track a usage frequency for a given application and/or one or more features from one or more applications.

An application usage frequency can include a number of times that the application has been used in a specific time period. A feature usage frequency can include a number of times that the feature has been used in a specific time period. Examples of how the server system 102 can use the usage data 110 to recommend shared electronic content 104 via the online service 112 are described in detail herein with respect to FIG. 2.

In some embodiments, the usage data 110 can be obtained by executing the content management module 114 to analyze electronic content received from a computing system 118*a* and generated by a client application 120*a* that is used with the online service 112. For example, a subscriber may use a client application 120*a* provided by the online service 112 to create or modify electronic content at the computing system 118*a*. The client application 120*a* can generate one or more data events as the subscriber uses the client application 120*a* to generate the electronic content. The data events can include, for example, a date and time at which the subscriber launched or otherwise activated the client application 120*a* at the computing system 118*a*, the use of different features of the client application 120*a* to generate or modify electronic content, a date and time at which the subscriber closed or otherwise deactivated the client application 120*a* at the computing system 118*a*, etc. The data events can be stored in metadata of the electronic content. The electronic content created with the client application 120*a* can be transmitted from the computing system 118*a* to the online service 112. The server system 102 can execute the content management module 114 to analyze metadata of the received electronic content. The content management module 114 can retrieve the data events from the analyzed metadata and store information describing the data events in the usage data 110.

In additional or alternative embodiments, the usage data 110 can be obtained by executing the content management module 114 to track the use of content creation applications executed at the server system 102 during a session with a subscriber. The session can include a period of time during which an entity is authorized to access one or more applications hosted by or accessible via a server system. A session can be delineated by a first point in time at which an entity is authenticated and a second point in time at which the authentication is terminated. The authentication can be terminated by the entity logging out of a server-based application, the authentication expiring after a period of inactivity or other predetermined time period, etc.

In a non-limiting example, a subscriber may access a content creation application executed at the server system 102 via the online service 112. The subscriber can use the content creation application to create or modify electronic content 104 stored at or accessible by the server system 102. The use of the content creation application by the subscriber can generate one or more data events. The data events can include, for example, a date and time at which the subscriber launched or otherwise activated the content creation application, the use of different features of the content creation application to generate or modify electronic content 104, a date and time at which the subscriber closed or otherwise deactivated the content creation application, etc. The content management module 114 can track the data events and store information describing the data events in the usage data 110.

Figure 2:
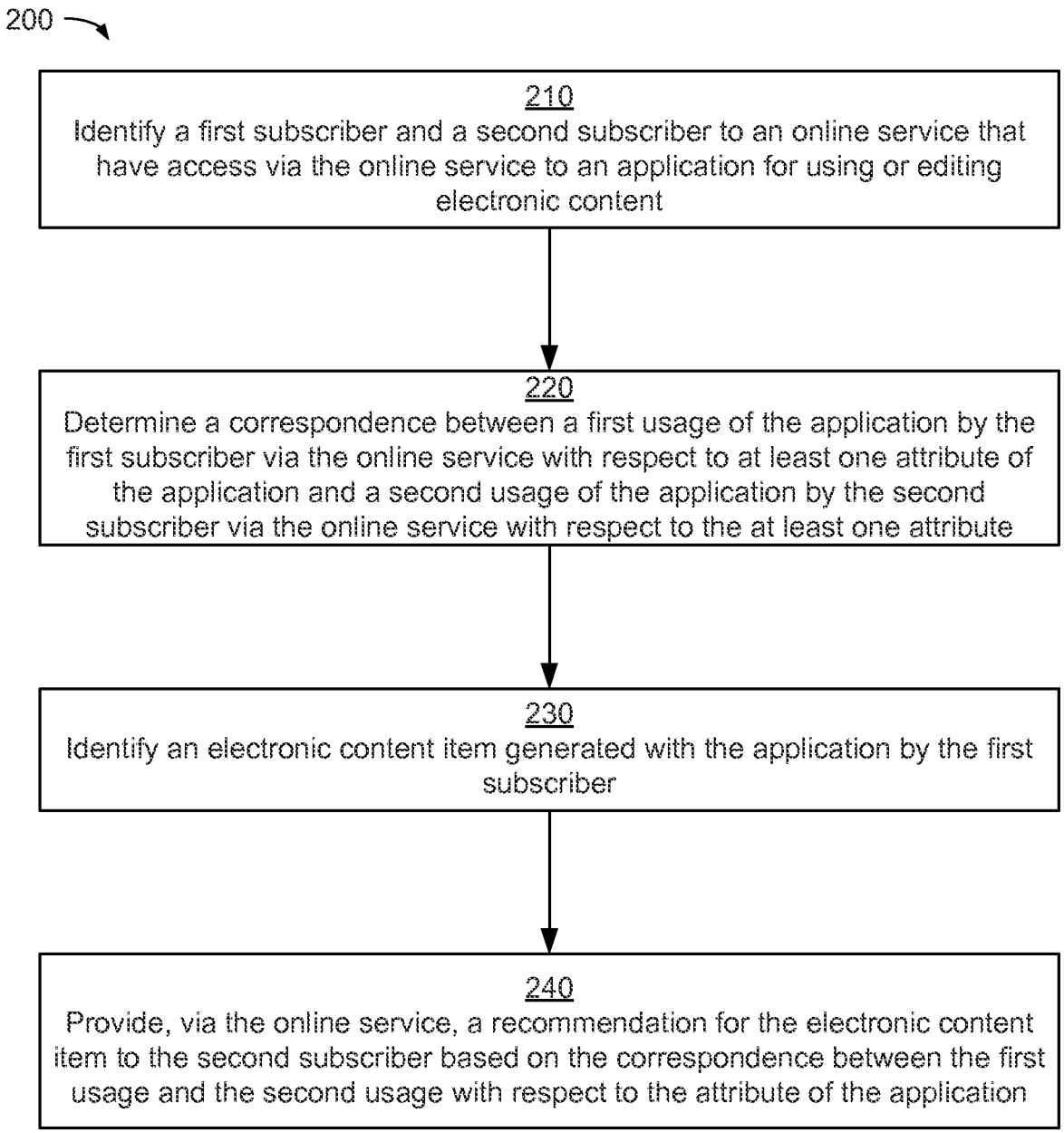
FIG. 2 is a flow chart illustrating an example of a method for recommending shared electronic content via an online service according to certain exemplary embodiments.

FIG. 2 is a flow chart illustrating an example of a method 200 for recommending shared electronic content via an online service. For illustrative purposes, the method 200 is described with reference to the implementation depicted in FIG. 1. Other implementations, however, are possible.

The method 200 involves identifying a first subscriber and a second subscriber to an online service that have access via the online service to an application for generating electronic content, as depicted in block 210. For example, the server system 102 can execute one or more modules of the online service 112 to identify subscribers that have access to an application that has been downloaded from the server system 102, is executed at the server system 102, or is otherwise accessible via the online service 112. Each of the subscribers can be identified by referencing a respective subscriber account stored in a record of a database or other suitable data structure in a non-transitory computer-readable medium that is included in or accessible by the server system 102. Each subscriber account can include a unique identifier for a respective subscriber and information regarding one or more client applications 120a, 120b that the subscriber can access via the online service 112 or that the subscriber has downloaded using the online service 112.

The method 200 also involves determining a correspondence between a first usage of the application by the first subscriber via the online service with respect to at least one attribute of the application and a second usage of the application by the second subscriber via the online service with respect to the attribute of the application, as depicted in block 220. For example, the server system 102 can execute the recommendation module 116 to determine the correspondence between usage by different subscribers of a client application by the online service 112 (e.g., an image manipulation application). The recommendation module 116 can use one or more of the subscriber data 106, the application data 108, and the usage data 110 to determine the correspondence between the subscribers.

In some embodiments, determining the correspondence between usages of an application by the subscribers can involve determining that one or more attributes of the first subscriber's subscription to the online service 112 corresponds to one or more attributes of the second subscriber's subscription to the online service 112. In one non-limiting example, the corresponding attribute of the different subscriptions can be a state of the subscription, such as both subscriptions being paid subscriptions, trial subscriptions, etc. In another non-limiting example, the corresponding attribute of the different subscriptions can be a type of subscription. A specific type of subscription can provide access to a specific set of features in the client applications 120a, 120b. For example, an enterprise subscription provided to businesses or other organizations may provide access to a first set of features of the client applications 120a, 120b, an educational subscription provided to universities or other educational institutions may provide access to a second set of features of the client applications 120a, 120b, and a retail subscription provided to individual users who purchase subscriptions in an open market may provide access to a third set of features of the client applications 120a, 120b.

In additional or alternative embodiments, determining the correspondence between the first and second subscribers can involve determining that both subscribers have used one or more of the same features in the client applications 120a, 120b to generate, modify, execute, view, or otherwise use electronic content.

In additional or alternative embodiments, determining the correspondence between the first and second subscribers can involve determining a common level of expertise between the first subscriber and the second subscriber with respect to the application. For example, the server system 102 may determine that both subscribers are novice users, intermediate users, or expert users. The online service 112 can use any suitable criteria to determine a level of expertise that a subscriber has with respect to a given client application.

One non-limiting example of a suitable criterion for determining a subscriber's expertise is a usage frequency. A usage frequency can include a frequency with which the subscriber uses the client application. The server system 102 can assign a higher level of expertise to a subscriber based on the subscriber having a higher usage frequency. The server system 102 can assign a lower level of expertise to a subscriber based on the subscriber having a lower usage frequency.

Another non-limiting of a suitable criterion for determining a subscriber's expertise is the type of feature usage by the subscriber for the client application. Different features in a given client application may be used by subscribers with different levels of expertise at using the client application. For example, if the feature usage by a subscriber for an image editing application is limited to features that are used by a majority of subscribers (e.g., layers, selection, use of default filters, etc.), the subscriber is more likely to be a novice or a beginner having a lower level of expertise. The online service 112 can identify the subscriber as a novice or a beginner based on determining that the majority of the subscriber's feature usage involves these commonly used features. If the feature usage by a subscriber involves more advanced features in the image editing application (e.g., creating custom filters, creating custom brushes, etc.), the online service 112 may determine that the subscriber is an advanced user having a higher level of expertise.

In some embodiments, a level of expertise for a given subscriber can be determined by the server system 102 based on an analysis of the features of the client applications 120a, 120b used by the subscribers to generate, modify, execute, view, or otherwise use electronic content. For example, a particular application may include a set of features that can be used to view, execute, modify, create, or otherwise use electronic content. One subset of features may be used by all types of subscribers (e.g., common features such as "Zoom," "Copy," "Paste," etc.). Another subset of features may be used by subscribers with an intermediate level of familiarity with the client application. For example, the subscriber's intermediate level of expertise may be indicated by the subscriber's use of contextual menus by right-clicking on certain objects in electronic content, the subscriber's modifications to object properties that are accessible via menu selections used by a minority of subscribers, and other usages of more advanced features of the client application. Another subset of features may be used by subscribers with an expert level of familiarity with the client application. For example, a subscriber may be able to program sub-routines, define customized functions, or otherwise utilize features of the client application that require a detailed knowledge of how the client application may be used to modify or create electronic content. The use of these features may indicate that the subscriber has a detailed level of expertise with respect to the client application.

Another non-limiting example of a suitable criterion for determining a subscriber's expertise is a variant of a client application used by the subscriber. Some client applications may have different variants for subscribers with different levels of proficiency (e.g., "standard," "professional," etc.). The online service may determine the subscriber's expertise level based on the variant of the client application used by the subscriber.

In additional or alternative embodiments, determining the correspondence between the first and second subscribers can involve identifying a similar frequency or pattern of usage of the client applications 120a, 120b by the subscribers. One non-limiting example of a frequency or pattern of usage is a number of times the client applications 120a, 120b is executed by a subscriber within a specified time period. Another non-limiting example of a frequency or pattern of usage is a usage duration of the client application (e.g., an average amount of time a subscriber uses the application each time the application is executed in response to a request by the user, a total amount of time the subscriber has used the application since subscribing, a total amount of time the subscriber has used the application since installing the application, etc.). Another non-limiting example of a frequency or pattern of usage is an analysis of which applications of the online service 112 are used more frequently or for longer durations in comparison to other applications provided via the online service 112. Another non-limiting example of a frequency or pattern of usage is an analysis of which features in a particular application are used more frequently in comparison to other features of the application.

In additional or alternative embodiments, determining the correspondence between the first and second subscribers can involve determining the correspondence between histories of activity in the online service 112 by the subscribers. A history of activity in the application can include usage of the client applications 120a, 120b as well as activities other than usage of the client applications 120a, 120b.

In some embodiments, the history of activity can be used to determine the longevity or loyalty of a given subscriber with respect to the online service 112. For example, a history of activity for a given subscriber may indicate that the subscriber is a relatively new user (i.e., the subscriber first subscribed with the online service 112 within a relatively recent time period, such as within the last week, month, or year), that the subscriber is a regular or other long-time user (i.e., the subscriber first subscribed with the online service 112 within a longer time period, such as a period of months or years and/or has renewed the subscription at or near the expiration of each subscription term), or that the subscriber is an intermittent user (i.e., the subscriber has subscribed with the online service 112 and allowed the subscription to lapse without renewal multiple times over a period of time).

In additional or alternative embodiments, the history of activity can be used to determine how a given subscriber interacts with one or more types of electronic content 104 via the online service 112. In one non-limiting example, a history of activity for a given subscriber can indicate that the subscriber has historically generated content (e.g., created content or modified content generated by others). In another non-limiting example, a history of activity for a given subscriber can indicate that the subscriber has historically consumed content (e.g., viewed or otherwise used content generated by others).

The method 200 also involves identifying an electronic content item generated with the application by the first subscriber, as depicted in block 230. For example, the server system 102 can execute one or more of the content management module 114 and the recommendation module 116 to identify an electronic content item from the electronic content 104 that was generated with the client application 120a by the first subscriber.

In some embodiments, the electronic content item can be identified using a recommendation factor that is determined by the recommendation module 116. Electronic content items with a recommendation factor having a value greater than a specified threshold value can be selected for recommendation to another subscriber of the online service 112. The recommendation factor can be determined using one or more of the parameters used to determine a correspondence between subscribers. For each of the parameters, a weighting factor can be applied.

A non-limiting example of a function that models the operations for determining a recommendation factor for different products (i.e., applications used with the online service 112) is $$R_f = \text{Function}\left(\frac{\sum (W_p U_f(P_n), W_p U_f(P_n F_n))}{\sum_0^{U_t} P_n}, f(C_i), g(A_i)\right)$$

where $R_f$ is the recommendation factor, $W_p$ is the weight allocated to a given product $P_n$ and the features in that product, $U_f$ is the usage frequency of the product $P_n$, $P_n$ is the product available for use with the online service 112, $F_n$ is the number of features for the product $P_n$, and $U_t$ is the usage time for the product $P_n$. The function $f(C_i)$ can represent one or more operations used to determine a weight for community involvement $C_i$. The community involvement $C_i$ can be determined by a given subscriber's role, activities, and/or contributions with respect to an online community that is hosted by or accessible via the online service 112. For example, the community involvement can have states such as "Content Consumer" (i.e., a subscriber who uses content by others, but does not create or modify content), "Content Producer" (i.e., a subscriber who creates content or modifies content, but does not otherwise use content created by others), or "Both" (i.e., a subscriber who both creates or modifies content and otherwise uses content created by others). The function $g(A_i)$ can represent one or more operations used to determine a weight for a subscriber's association $A_i$ with the online service 112. The subscriber's association $A_i$ with the online service 112 can be determined by the subscriber's usage of one or more client applications provided by the online service 112, subscription types for these client applications, frequency of products purchase, etc. For example, the subscriber's association $A_i$ can have states such as "New User" (i.e., first time purchasing a product from the online service 112, first time joining an online community accessible via the online service 112), "Intermittent User" (i.e., a subscriber who buys a subscription, allows the subscription to lapse after some amount of usage, and later re-subscribes after allowing the subscription to lapse), and "Regular User" (i.e., purchasing a subscription for the online service 112, consistently using the subscription over an extended period of time, and regularly renewing the subscription without lapse).

The method 200 also involves providing, via the online service, a recommendation for the electronic content item to the second subscriber based on the correspondence between the first usage and the second usage with respect to the attribute of the application, as depicted in block 240. For example, the server system 102 can execute the recommendation module 116 to provide a recommendation to the second subscriber.

The recommendation can be provided in an electronic communication via a suitable data network. In some embodiments, the recommendation can be provided in an interface generated by the online service 112 in response to the second subscriber accessing the online service 112 (e.g., as a pop-up that appears after the second subscriber's next log-in to the online service 112). In additional or alternative embodiments, the online service 112 can transmit an electronic communication (e.g., an e-mail or text message) to an electronic address associated with the subscriber that is external to the online service 112 (e.g., an e-mail address or phone number retrieved from a subscriber account record for the second subscriber).

In one non-limiting example, the online service 112 can provide recommendations to one or more subscribers that they may be interested in accessing artwork or other electronic content generated by a Subscriber A of the online service 112. The content management module 114 can obtain the data describing the artwork generated by the Subscriber A. For example, the artwork may include metadata that includes information about the creation or modification of the artwork. The metadata can identify the application used in creating the artwork or other electronic content item (e.g., "Image Manipulation Application A"). The metadata can also identify the features of the application that were used in creating or modifying the artwork. Non-limiting examples of these features include retouching tools (e.g., an eraser tool, blur tool, etc.), painting tools (e.g., a brush tool, a pencil tool, mixer tool, artistic effects tool), and navigation tools (e.g., an object rotation tool, a camera rotation tool). The recommendation module 116 can compare the data obtained from the artwork with data describing other subscribers to the online service 112 (e.g., the application, features available in the application, the version of the application, tools used in the application, frequency of usage for the application, etc.). The recommendation module 116 can determine that a match or other correspondence exists between the information about the Subscriber A and information in the subscriber account records for other subscribers (e.g., Users B and Subscriber C). The recommendation module 116 can return a list of subscribers for which the correspondence was determined (i.e., Subscriber B and Subscriber C). In some embodiments, the recommendation module 116 can filter the list based on usage frequency (e.g., more than 150 uses of the application), usage duration (e.g., more than 1500 total minutes of usage), subscription type (e.g., paid subscription or trial), and subscription status (e.g., active subscriptions). For example, the additional filtering may remove Subscriber C from the list of corresponding subscribers. The recommendation module 116 can provide a recommendation for the artwork to Subscriber B (i.e., the corresponding subscriber after the list has been filtered).

In another non-limiting example, a subscriber entity "Digital Creative Agency" may create "digital brushes," which can be targeted to creative artists (e.g., painters, designers, etc.) for use in digital artworks. Digital Creative Agency may sell or otherwise provide the digital brushes as installable plug-ins via the online service 112. These digital brush plug-ins can be installed in and work with client applications such as "Drawing Application A" and "Image Manipulation Application B." Digital Creative Agency may wish to identify other subscribers to the online service 112 to which the digital brushes may be promoted. Digital Creative Agency may have the following objectives for the targets of the digital brushes:

a) Digital Creative Agency may wish to target subscribers who have purchased or otherwise use Drawing Application A and/or Image Manipulation Application B;
   b) Digital Creative Agency may wish to target subscribers with a high level of expertise in Drawing Application A and/or Image Manipulation Application B, and who can therefore use the sophisticated strokes and related operations of the digital brush;
   c) Digital Creative Agency may wish to target subscribers who frequently use Drawing Application A and/or Image Manipulation Application B, and who therefore may be more likely to consistently purchase and renew subscriptions for the digital brushes;
   d) Digital Creative Agency may wish to conduct a marketing campaign during a period of x months (e.g., two months prior to fiscal year closure, or three months prior to college exams, etc.); and
   e) Digital Creative Agency may wish to market the digital brush to "college going" designers or artists, as well as to content creators who are active in an online community by building and sharing content.

The server system 102 can execute the recommendation module 116 of the online service 112 to provide recommendations to Digital Creative Agency regarding subscribers of the online service 112 that may be attractive targets for the digital brush. For example, the server system 102 can execute the recommendation module 116 to evaluate and rank subscribers based on following parameters:

a) Subscribers who have purchased Drawing Application A having designation $P_1$ and Image Manipulation Application B having designation $P_2$ (i.e., $P_n = P_1, P_2$);
   b) Weightage assigned to the products (i.e., $W_p = 0.8$);
   c) Usage $U_f$=high frequency of usage;
   d) $F_n$="Brush" or similar features for Drawing Application A product and/or Image Manipulation Application B product;
   e) $U_t$=Duration selected by Digital Creative Agency;
   f) Purchase Type: "Paid Subscriber";
   g) Subscription type: "Active";
   h) Subscriber License Type: "Student License," "Retail License";
   i) Expertise: "Experienced";
   j) Customer Association: "Regular";
   k) Community Involvement: "Both";

The recommendation module 116 can use these parameters in combination to determine recommendation factors for various subscribers with respect to the digital brush tool. The recommendation module 116 can generate a recommendation based on the recommendation factors. In some embodiments, the recommendation module 116 can transmit a recommendation via a data network to a computing system associated with Digital Creative Agency. The recommendation can identify the subscribers who may be attractive targets for the digital brush plug-in. In additional or alternative embodiments, the recommendation module 116 can transmit a recommendation via a data network to computing systems associated with subscribers identified by the recommendation module based on the recommendation factors. The recommendation can notify the subscribers that they may be interested in purchasing the digital brush plug-in.

Figure 3:
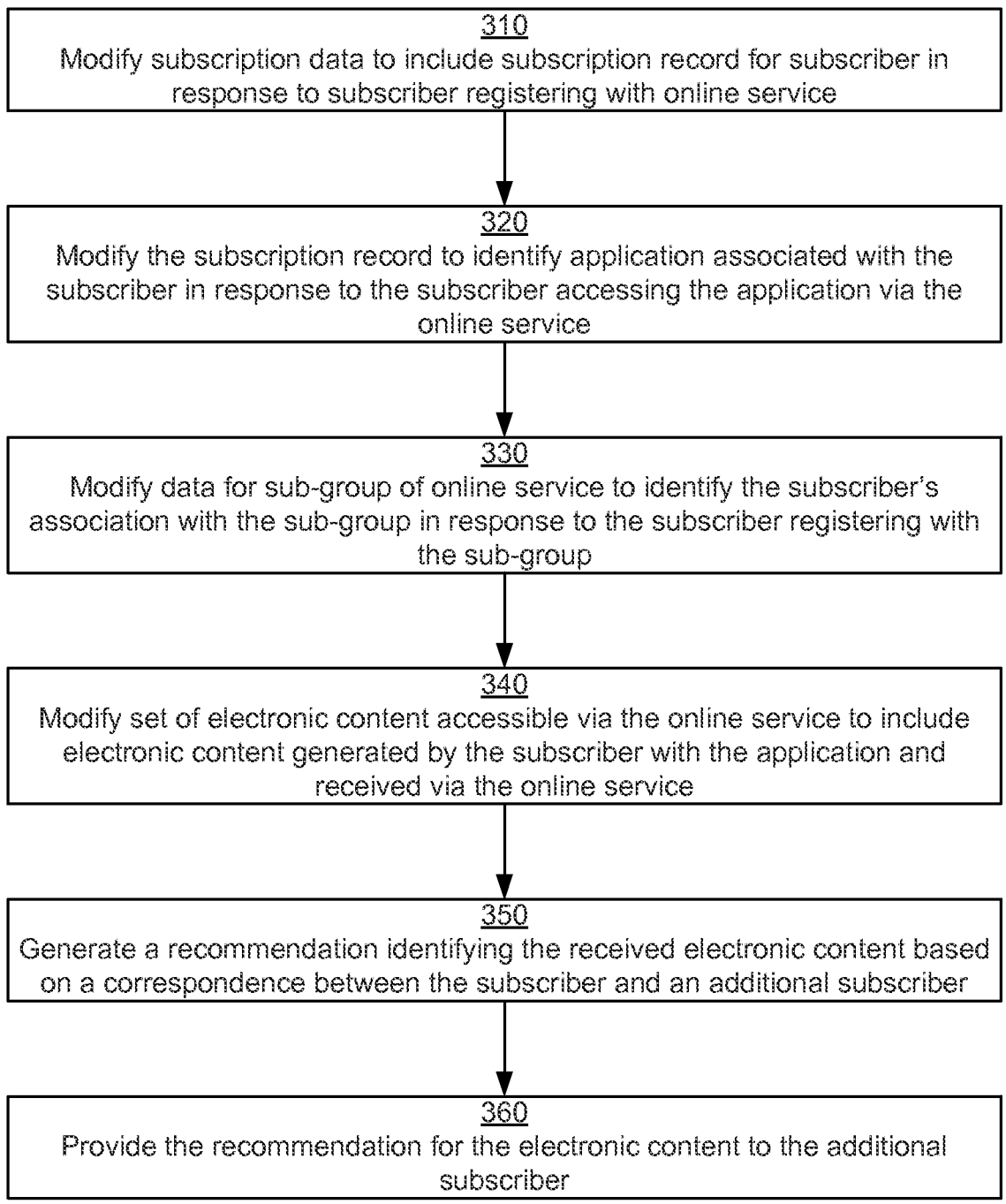
FIG. 3 is a flow chart illustrating an example of a method for receiving electronic content from a first subscriber of the online service and recommending the electronic content to a second subscriber of the online service according to certain exemplary embodiments.

FIG. 3 is a flow chart illustrating an example of a method 300 for receiving electronic content from a first subscriber of the online service and recommending the electronic content to a second subscriber of the online service. For illustrative purposes, the method 300 is described with reference to the implementation depicted in FIG. 1. Other implementations, however, are possible.

The method 300 involves modifying subscription data for an online service to include a subscription record for a subscriber in response to the subscriber registering with the online service, as depicted in block 310. For example, the server system 102 can execute the program code for implementing a registration service of the online service 112. The registration service or other program code can be configured for performing one or more operations that modify the subscriber data 106 to include subscription records for subscribers that register with the online service 112. A non-limiting example of such operations includes creating a new record in a database or other data source in which the subscriber data 106 is stored. Data that describes the subscriber entered by the subscriber at one of the computing systems 118*a*, 118*b* or some other suitable computing device can be received by the server system 102 over a suitable data network. The server system 102 can store the received data in the created record.

The method 300 also involves modifying the subscription record to identify an application associated with the subscriber in response to the subscriber accessing the application via the online service, as depicted in block 320. For example, the server system 102 can execute the program code for implementing one or more of a customer data service, a subscription service, or other service configured for performing operations that modify a subscription record stored in the subscriber data 106. The subscription record stored in the subscriber data 106 can be modified to identify a client application that the subscriber has selected for purchase, downloaded, used, or otherwise accessed via the online service 112.

The method 300 also involves modifying data for a sub-group of the online service to identify the subscriber's association with the sub-group in response to the subscriber registering with the sub-group, as depicted in block 330. For example, the server system 102 can execute program code configured to perform one or more operations for modifying a database or other suitable data source that stores data about online communities in the online service 112 or other sub-groups of subscribers to the online service 112. The operations for modifying the data about the sub-groups can be performed in response to the subscriber registering for the sub-group or otherwise joining a community of the online service 112. A non-limiting example of such a sub-group is a group of producers and consumers of creative content (e.g., artwork, videos, music, etc.) that may wish to sell, purchase, or otherwise share the creative content via the online service 112.

The method 300 also involves modifying a set of electronic content accessible via the online service to include additional electronic content generated by the subscriber with the application and received via the online service, as depicted in block 340. For example, the server system 102 can execute the content management module 114 to perform one or more operations for modifying the electronic content 104 to include additional electronic content generated by the subscriber with a client application 120*a*. The content management module 114 can analyze metadata associated with the received electronic content. The content management module 114 can use the analyzed metadata to update the usage data 110 to include information describing the use of the application by the subscriber to create the electronic content, as described above with respect to FIG. 1.

The method 300 also involves generating a recommendation identifying the received electronic content based on a correspondence between the subscriber and an additional subscriber, as depicted in block 350. For example, the server system 102 can execute the recommendation module 116 to perform one or more operations of the method 200 that is described above with respect to FIG. 2 for generating a recommendation identifying the received electronic content.

The method 300 also involves providing the recommendation for the electronic content to the additional subscriber, as depicted in block 360. For example, the server system 102 can execute the recommendation module 116 to provide the recommendation for the electronic content to the additional subscriber, as described above with respect to block 240 of FIG. 2.

Figure 4:
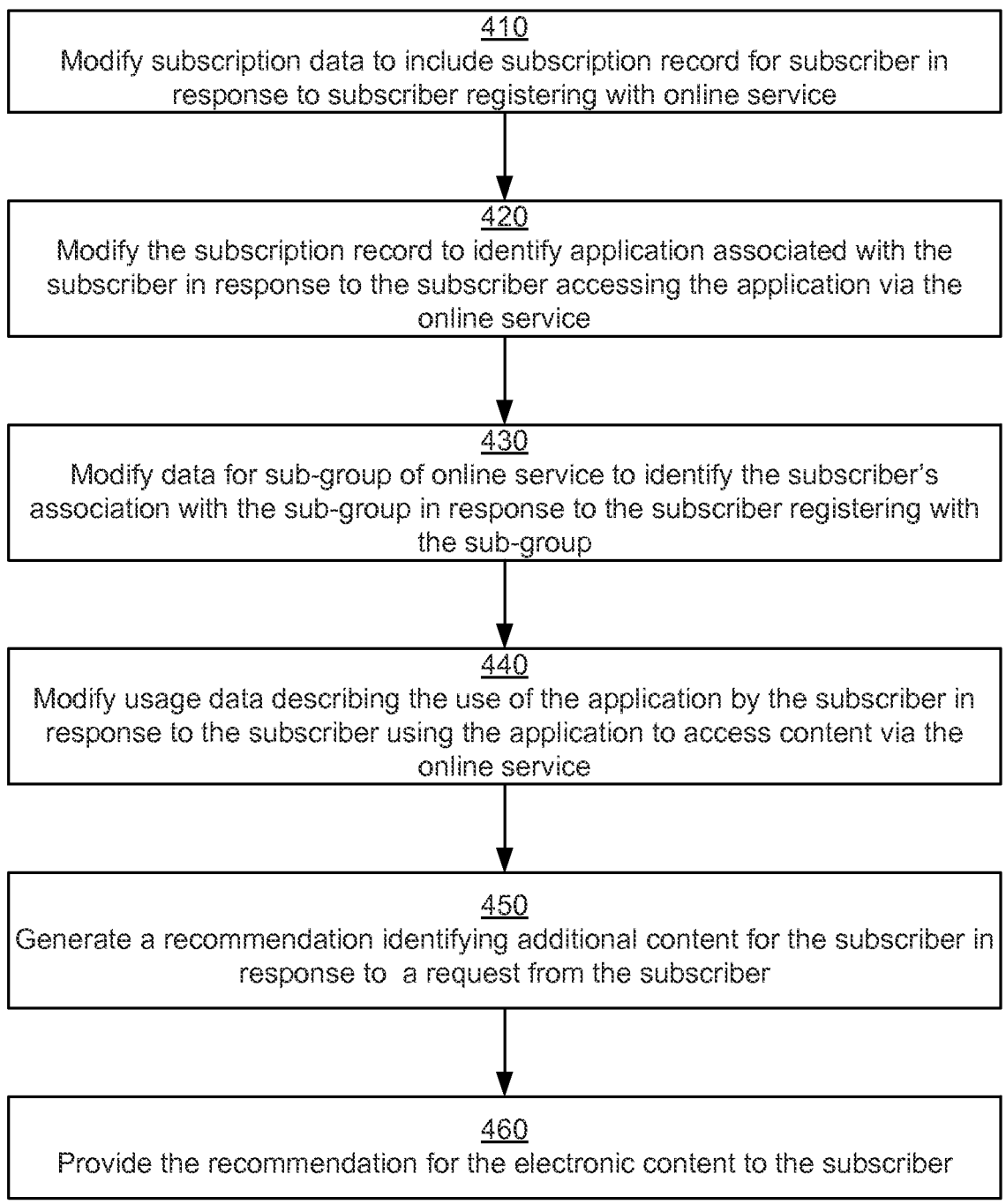
FIG. 4 is a flow chart illustrating an example of a method for identifying a subscriber of the online service to which electronic content is to be recommended according to certain exemplary embodiments.

FIG. 4 is a flow chart illustrating an example of a method 400 for identifying a subscriber of the online service 112 to which electronic content is to be recommended. For illustrative purposes, the method 400 is described with reference to the implementation depicted in FIG. 1. Other implementations, however, are possible.

The method 400 involves modifying subscription data for an online service to include a subscription record for a subscriber in response to the subscriber registering with the online service, as depicted in block 410. For example, the server system 102 can perform one or more operations that add a subscription record to the subscriber data 106 that are similar to the operations described above with respect to block 310 FIG. 3.

The method 400 also involves modifying the subscription record to identify an application associated with the subscriber in response to the subscriber accessing the application via the online service, as depicted in block 420. For example, the server system 102 can perform one or more operations that associate a particular application with a subscriber that are similar to the operations described above with respect to block 320 in FIG. 3.

The method 400 also involves modifying data for a sub-group of the online service to identify the subscriber's association with the sub-group in response to the subscriber registering with the sub-group, as depicted in block 430. For example, the server system 102 can perform one or more operations that associate a particular sub-group of the online service 112 with a subscriber that are similar to the operations described above with respect to block 330 in to FIG. 3.

The method 400 also involves modifying usage data describing the use of the application by the subscriber in response to the subscriber using the application to access content via the online service, as depicted in block 440. For example, the server system 102 can execute the content management module 114 to perform one or more operations for tracking interactions with electronic content 104 or other electronic content by the subscriber. In some embodiments, these interactions can include generating additional electronic content that is added to the electronic content 104 by the content management module 114. The content management module 114 can analyze metadata associated with the received electronic content and update the usage data 110 to include information describing the use of the application by the subscriber to create the electronic content, as described above with respect to FIG. 1. In additional or alternative embodiments, these interactions can include using a suitable client application to view, download, execute, or otherwise use electronic content via the online service 112.

The server system 102 can execute any suitable algorithm or perform any suitable operations for tracking the usage of an application by a subscriber. In one non-limiting example, a client application executed on a computing system may regularly transmit usage metrics via a data network to a usage tracking module executed by the server system 102. In some embodiments, a client application can transmit usage metrics to an online service 112 according to a specified schedule (i.e., weekly, monthly, etc.). In additional or alternative embodiments, a client application can transmit usage metrics to an online service 112 contemporaneously with the client application sending a request to renew a subscription. The usage metrics can include data events generated at the computing system in response to operations performed by the client application when executed at the computing system. The data events can be associated with an identifier of a subscriber or an identifier of the computing The server system 102 can store the usage metrics in a non-transitory computer-readable medium. The server system 102 can analyze the usage metrics to determine the use of an application by a subscriber. For example, the server system 102 can compare an identifier of a subscriber (or a computing system) included in the usage metrics with an identifier of a subscriber (or a computing system associated with a subscriber) that is stored in the subscriber data 106. The server system 102 can determine, based on the comparison, that the usage metrics involve usage by a given subscriber. The server system 102 can modifying the usage data 110 to include the use of the application by the subscriber determined from the received usage metrics.

The method 400 also involves generating a recommendation identifying additional electronic content in response to a request from the subscriber, as depicted in block 450. For example, the server system 102 can execute the recommendation module 116 to perform one or more operations of the method 200 that is described above with respect to FIG. 2 for generating a recommendation identifying the received electronic content. The operations of the method 200 can be performed in response to a subscriber using a client application to request recommended content from the online service 112. For example, the subscriber may be registered with a community or other sub-group of subscriber that is used for selling, purchasing, or otherwise sharing creative content. The subscriber may access a browsing interface generated by the online service 112 for use by members of the community. A request for a recommendation may be received from the subscriber via the interface. The server system 102 may execute the method 200 in response to receiving the request for the recommendation via the online service 112.

The method 400 also involves providing the recommendation for the electronic content to the subscriber, as depicted in block 460. For example, the server system 102 can execute the recommendation module 116 to provide the recommendation for the electronic content to the subscriber, as described above with respect to block 240 of FIG. 2.

Any suitable data structure can be used to track data about different subscribers' usages of applications provided via the online service 112. For example, FIG. 5 is an example of a subscriber profile record 502 that can be used to identify how a given subscriber may utilize one or more applications. The subscriber profile record 502 depicted in FIG. 5 includes a "Subscription ID" field, a "Profile Type" field, a "Subscription Type" field, a "Subscription State" field, a "Product Installed" field, a "Product Version" field, a "Most recent Updates Installed" field, and a "Toolset used" field. The "Subscription ID" field can include a unique identifier for the subscriber's account (e.g., an account number). The "Profile Type" field can indicate whether the subscription to the online service 112 is a retail edition or a student edition and/or whether a given product provided via the online service 112 includes features from the retail edition or the student edition. The "Subscription Type" field can identify, for example, whether the subscription to the online service 112 is a paid subscription or a trial subscription. The "Product Installed" field can identify one or more applications provided to the subscriber via the online service 112 (e.g., different image manipulation applications such as "Image Application 1" and "Image Application 2") and the "Product Version" field can identify which versions of those applications have been provided to the subscriber. The "Toolset Used" fields can identify, for each application, which features of a given application are available for use by the subscriber and/or which of these features have been used by the subscriber.

Figure 6:
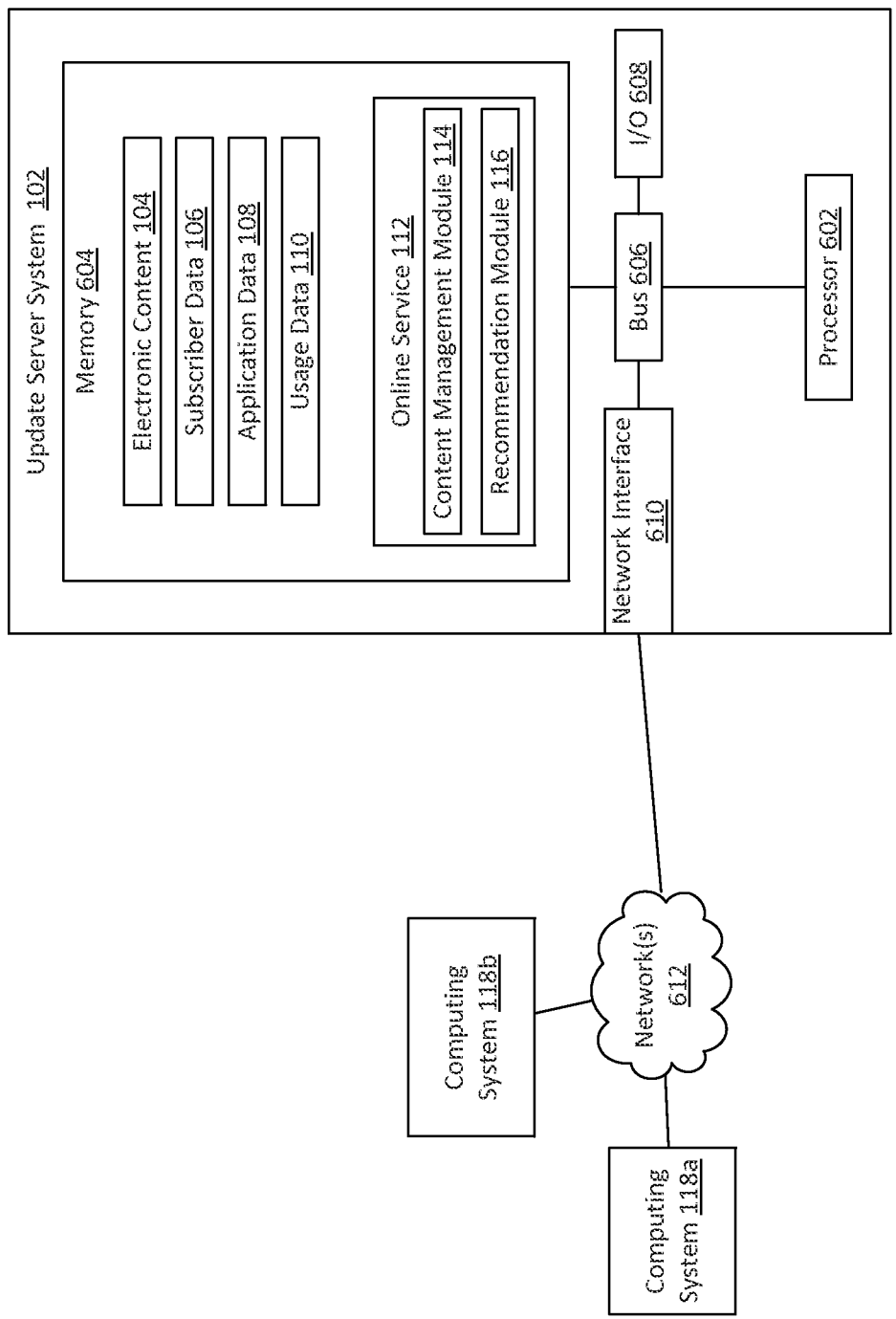
FIG. 6 is a block diagram depicting an example of a server system configured for recommending shared electronic content via an online service according to certain exemplary embodiments according to certain exemplary embodiments.

Any suitable computing system or group of computing systems can be used to recommend shared electronic content via an online service. For example, FIG. 6 is a block diagram depicting an example of a server system 102 configured for recommending shared electronic content 104 via an online service 112.

The server system 102 can include a processor 602 that is communicatively coupled to a memory 604 and that executes computer-executable program code and/or accesses information stored in the memory 604. The processor 602 may include a microprocessor, an application-specific integrated circuit ("ASIC"), a state machine, or other processing device. The processor 602 can include any of a number of processing devices, including one. Such a processor can include or may be in communication with a non-transitory computer-readable medium storing instructions that, when executed by the processor 602, cause the processor to perform the operations described herein.

The memory 604 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The server system 102 may also include a number of external or internal devices such as input or output devices. For example, the server system 102 is shown with an input/output ("I/O") interface 608 that can receive input from input devices or provide output to output devices. A bus 606 can also be included in the server system 102. The bus 606 can communicatively couple one or more components of the server system 102.

The server system 102 can execute program code that configures the processor 602 to perform one or more of the operations described above with respect to FIGS. 1-4. The program code can include one or more of the content management module 114 and the recommendation module 116 of the online service 112. The program code may be resident in the memory 604 or any suitable computer-readable medium and may be executed by the processor 602 or any other suitable processor.

In some embodiments, the electronic content 104, the subscriber data 106, the application data 108, and the usage data 110 can be resident in the memory 604, as depicted in FIG. 6. In other embodiments, one or more of the electronic content 104, the subscriber data 106, the application data 108, and the usage data 110 can be resident in a memory that is accessible via a data network, such as a memory accessible to a cloud service.

The server system 102 can also include at least one network interface 610. The network interface 610 can include any device or group of devices suitable for establishing a wired or wireless data connection to one or more data networks 612. Non-limiting examples of the network interface 610 include an Ethernet network adapter, a modem, and/or the like. The server system 102 can communicate with computing systems 118a, 118b the data network 612.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
    identifying a first subscriber to an online service who has access via the online service to a first electronic content editing software application;
    retrieving usage data for the first subscriber indicating a first set of features of the first electronic content editing software application used by the first subscriber to edit a first electronic content item with the first electronic content editing software application;
    identifying a second subscriber to the online service who has access via the online service to a second electronic content editing software application, wherein the second electronic content editing software application provides substantially similar electronic content editing functionality as the first electronic content editing software application;
    retrieving usage data for the second subscriber indicating a second set of features of the second electronic content editing software application used by a second subscriber edit a second electronic content item with the second electronic content editing software application;
    determining a correspondence between the first set of features and the second set of features, wherein the correspondence indicates a common level of expertise or proficiency between the first subscriber and the second subscriber with respect to use of electronic content editing software applications and wherein the correspondence is determined by:
    determining that both the first set of features and the second set of features comprise expert features used by expert users of electronic content editing software applications, or
    determining that both the first set of features and the second set of features comprise common features used by non-expert users of electronic content editing software applications; and
    providing, via the online service, a recommendation for the first electronic content item created by the first subscriber to the second subscriber based on the correspondence.

2. The method of claim 1, further comprising determining an additional correspondence between a first subscription of the first subscriber and a second subscription of the second subscriber, wherein the recommendation is also provided based on the additional correspondence.

3. The method of claim 2, wherein the additional correspondence is determined based on at least one of:
    each of the first subscription and the second subscription being a paid subscription; or
    each of the first subscription and the second subscription being an unpaid subscription.

4. The method of claim 1, further comprising determining an additional correspondence between a first history of activity in the online service by the first subscriber other than usage of the first electronic content editing software application and a second history of activity in the online service by the second subscriber other than usage of the second electronic content editing software application, wherein the recommendation is also provided based on the additional correspondence.

5. A system comprising:
    a processing device; and
    a non-transitory computer-readable medium communicatively coupled to the processing device,
    wherein the processing device is configured to execute instructions to perform operations comprising:

identifying a first subscriber to an online service who has access via the online service to a first electronic content editing software application;

retrieving usage data for the first subscriber indicating a first set of features of the first electronic content editing software application used by the first subscriber to edit a first electronic content item with the first electronic content editing software application;

identifying a second subscriber to the online service who has access via the online service to a second electronic content editing software application, wherein the second electronic content editing software application provides substantially similar electronic content editing functionality as the first electronic content editing software application;

retrieving usage data for the second subscriber indicating a second set of features of the second electronic content editing software application used by a second subscriber edit a second electronic content item with the second electronic content editing software application;

determining a correspondence between the first set of features and the second set of features, wherein the correspondence indicates a common level of expertise or proficiency between the first subscriber and the second subscriber with respect to use of electronic content editing software applications and wherein the correspondence is determined by:

determining that both the first set of features and the second set of features comprise expert features used by expert users of electronic content editing software applications, or determining that both the first set of features and the second set of features comprise common features used by non-expert users of electronic content editing software applications; and providing, via the online service, a recommendation for the first electronic content item created by the first subscriber to the second subscriber based on the correspondence.

6. The system of claim 5, wherein the operations further comprise determining an additional correspondence between usages by the first subscriber and the second subscriber of an additional electronic software application that is accessible via the online service, wherein the recommendation is also provided based on the additional correspondence.

7. The system of claim 5, wherein the first set of features comprises a plurality of features provided by the electronic content editing software application and used to generate the first electronic content item.

8. The system of claim 5, wherein the operations further comprise determining an additional correspondence between a first subscription of the first subscriber and a second subscription of the second subscriber, wherein the recommendation is also provided based on the additional correspondence.

9. The system of claim 8, wherein the additional correspondence is determined based on at least one of:

each of the first subscription and the second subscription being a paid subscription; or each of the first subscription and the second subscription being an unpaid subscription.

10. The system of claim 5, wherein the operations further comprise determining an additional correspondence between a first history of activity in the online service by the first subscriber other than usage of the first electronic content editing software application and a second history of activity in the online service by the second subscriber other than usage of the second electronic content editing software application, wherein the recommendation is also provided based on the additional correspondence.

11. A non-transitory computer-readable medium having program code stored thereon, the program code including instructions to perform operations comprising:

identifying a first subscriber to an online service who has access via the online service to a first electronic content editing software application;

retrieving usage data for the first subscriber indicating a first set of features of the first electronic content editing software application used by the first subscriber to edit a first electronic content item with the first electronic content editing software application;

identifying a second subscriber to the online service who has access via the online service to a second electronic content editing software application, wherein the second electronic content editing software application provides substantially similar electronic content editing functionality as the first electronic content editing software application;

identifying a second set of features of the second electronic content editing software application used by a second subscriber to edit a second electronic content item;

determining a correspondence between the first set of features and the second set of features, wherein the correspondence indicates a common level of expertise or proficiency between the first subscriber and the second subscriber with respect to use of electronic content editing software applications and wherein the correspondence is determined by:

determining that both the first set of features and the second set of features comprise expert features used by expert users of electronic content editing software applications, or determining that both the first set of features and the second set of features comprise common features used by non-expert users of electronic content editing software applications; and providing, via the online service, a recommendation for the first electronic content item created by the first subscriber to the second subscriber based on the correspondence.

12. The non-transitory computer-readable medium of claim 11, the operations further comprising determining an additional correspondence between a first subscription of the first subscriber and a second subscription of the second subscriber, wherein the recommendation is also provided based on the additional correspondence.

13. The non-transitory computer-readable medium of claim 11, the operations further comprising determining an additional correspondence between a first history of activity in the online service by the first subscriber other than usage of the first electronic content editing software application and a second history of activity in the online service by the second subscriber other than usage of the second electronic content editing software application, wherein the recommendation is also provided based on the additional correspondence.

14. The non-transitory computer-readable medium of claim 12, wherein the additional correspondence is determined based on at least one of:

each of the first subscription and the second subscription being a paid subscription; or each of the first subscription and the second subscription being an unpaid subscription.

15. The non-transitory computer-readable medium of claim 11, the operations further comprising determining an additional correspondence between usages by the first subscriber and the second subscriber of an additional electronic software application that is accessible via the online service, wherein the recommendation is also provided based on the additional correspondence.

16. The non-transitory computer-readable medium of claim 11, wherein the first set of features comprises a plurality of features provided by the electronic content editing software application and used to generate the first electronic content item.

17. The method of claim 1, further comprising determining an additional correspondence between usages by the first subscriber and the second subscriber of an additional electronic software application that is accessible via the online service, wherein the recommendation is also provided based on the additional correspondence.

18. The method of claim 1, wherein the first set of features comprises a plurality of features provided by the electronic content editing software application and used to generate the first electronic content item.

* * * * *